(12) United States Patent
Mitani et al.

(10) Patent No.: US 11,579,600 B2
(45) Date of Patent: Feb. 14, 2023

(54) ESTIMATION APPARATUS, ESTIMATION METHOD, AND COMPUTER-READABLE STORAGE MEDIUM

(71) Applicant: NEC Corporation, Tokyo (JP)

(72) Inventors: Shohei Mitani, Tokyo (JP); Satoru Yamano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/418,370

(22) PCT Filed: Dec. 28, 2018

(86) PCT No.: PCT/JP2018/048428
§ 371 (c)(1),
(2) Date: Jun. 25, 2021

(87) PCT Pub. No.: WO2020/136859
PCT Pub. Date: Jul. 2, 2020

(65) Prior Publication Data
US 2022/0066431 A1    Mar. 3, 2022

(51) Int. Cl.
*G05B 23/02*    (2006.01)
(52) U.S. Cl.
CPC .................................. *G05B 23/024* (2013.01)
(58) Field of Classification Search
CPC .................................................. G05B 23/024
See application file for complete search history.

(56) References Cited

U.S. PATENT DOCUMENTS

| | | | |
|---|---|---|---|
| 2004/0250166 A1 | 12/2004 | Dahlquist et al. | |
| 2014/0107977 A1* | 4/2014 | Fujishima | G06N 20/00 702/183 |
| 2018/0224836 A1 | 8/2018 | Oka | |
| 2020/0041306 A1 | 2/2020 | Takahashi | |
| 2020/0193307 A1 | 6/2020 | Kumano et al. | |
| 2020/0278670 A1 | 9/2020 | Kageyama | |

FOREIGN PATENT DOCUMENTS

| | | | | |
|---|---|---|---|---|
| CN | 106843111 A | | 6/2017 | |
| EP | 2442288 A1 * | | 4/2012 | ......... G05B 23/0254 |
| JP | S60107111 A | | 6/1985 | |
| JP | S62-287307 A | | 12/1987 | |
| JP | 2001100835 A | | 4/2001 | |

(Continued)

OTHER PUBLICATIONS

Machine Translation of WO 2015182072 A1 (Year: 2015).*

(Continued)

*Primary Examiner* — Mischita L Henson
(74) *Attorney, Agent, or Firm* — Sughrue Mion, PLLC (57) ABSTRACT

An estimation apparatus 1 includes: a normal index estimation unit 2 configured to estimate, using a second variable output by a second component 21 that influences a first variable output by a first component 21, an index A indicating that the first variable is achieved at a normal time; and an abnormality propagation information estimation unit 3 configured to estimate abnormality propagation information expressing an index indicating that an abnormality propagates to a third variable output by a third component 21 influenced by the first component 21, by changing the first variable.

9 Claims, 7 Drawing Sheets

(56) References Cited

FOREIGN PATENT DOCUMENTS

| JP | 2013199804 A | 10/2013 | |
|---|---|---|---|
| JP | 2015026252 A | 2/2015 | |
| JP | 2015210750 A | 11/2015 | |
| JP | 2017102669 A | 6/2017 | |
| WO | 02099550 A1 | 12/2002 | |
| WO | 2013011745 A1 | 1/2013 | |
| WO | WO-2015182072 A1 * | 12/2015 | .............. G06F 11/34 |
| WO | 2016/136198 A1 | 9/2016 | |
| WO | 2017/153016 A1 | 9/2017 | |
| WO | 2018216620 A1 | 11/2018 | |

OTHER PUBLICATIONS

English translation of Written opinion for PCT Application No. PCT/JP2018/048428, dated Apr. 2, 2019.
International Search Report for PCT Application No. PCT/JP2018/048428, dated Apr. 2, 2019.
JP Office Action for JP Application No. 2020-562260, dated Aug. 16, 2022 with English Translation.
Japanese Office Action tor JP Application No. 2020-562260, dated Dec. 27, 2022 with English Translation.

\* cited by examiner

| COMPONENT | ABNORMALITY FACTOR INFORMATION | | | |
|---|---|---|---|---|
| | t0 | ... | tn | ... |
| HEATER1(21a) | Af1_0 | ... | Af1_n | ... |
| HEATER2(21b) | Af2_0 | ... | Af2_n | ... |
| TEMPERATURE SENSOR1(21c) | Af3_0 | ... | Af3_n | ... |
| TEMPERATURE SENSOR2(21d) | Af4_0 | ... | Af4_n | ... |
| ... | ... | ... | ... | ... |

ESTIMATION APPARATUS, ESTIMATION METHOD, AND COMPUTER-READABLE STORAGE MEDIUM

This application is a National Stage Entry of PCT/JP2018/048428 filed on Dec. 28, 2018, the contents of all of which are incorporated herein by reference, in their entirety.

TECHNICAL FIELD

The present invention relates to an estimation apparatus and an estimation method for estimating an abnormality factor, and further relates to a computer-readable recording medium that includes a program recorded thereon for realizing the apparatus and method.

BACKGROUND ART

There is a demand that, in an OT (Operational Technology) system, even if the system has entered an abnormal state, the system is restored as soon as possible. Therefore, a handling method has been proposed for specifying an abnormality factor (fundamental factor of abnormality) that caused the system to enter the abnormal state.

For example, an abnormality detection apparatus that accurately detects an abnormality of a vehicle from operation data (e.g., traveling data) of the vehicle is disclosed in Patent document 1. The abnormality detection apparatus performs learning in advance using operation data in a normal state (normal data), and detects an abnormal state based on the deviation from the normal state. Also, the abnormality detection apparatus calculates, with respect to various multivariate time series data (variable values) included in the operation data, the degree of contribution to the deviation (shift of a variable value from the central value) due to abnormality, and with this, estimates the abnormality factor.

Also, an abnormality diagnostic apparatus that provides, when an abnormality has occurred in a work machine, useful information for specifying the abnormal part to an operator is disclosed in Patent document 2. The abnormality diagnostic apparatus determines a unit space using data in a normal state (normal data), calculates a Mahalanobis distance from the center of the unit space, and detects an abnormal state using the calculated Mahalanobis distance. Also, the abnormality diagnostic apparatus specifies the abnormality factor with reference to information in which data (feature amount) in a known abnormal state is associated with an abnormality factor (abnormality label) indicating the type of the known abnormal state, using data in an abnormal state (abnormal data).

LIST OF RELATED ART DOCUMENTS

Patent Document

Patent document 1: Japanese Patent Laid-Open Publication No. 2015-026252
Patent document 2: Japanese Patent Laid-Open Publication No. 2013-199804

SUMMARY

Technical Problems

However, in the abnormality detection apparatus disclosed in Patent document 1, when an abnormality factor is specified using normal operation data, the abnormality factor is specified based on contribution to abnormality determination or an accumulation point of abnormalities, and therefore the causal abnormality factor cannot be detected. In other words, the abnormality determination is merely performed using the correlation between pieces of data (variable values), and therefore a causal abnormality factor that does not directly contribute to the abnormality determination cannot be specified.

Also, with the abnormality diagnostic apparatus disclosed in Patent document 2, when an abnormality has occurred, although a known abnormality factor can be specified, an unknown abnormality factor cannot be specified. Also, abnormal data corresponding to a known abnormality factor (abnormality label) needs to be collected. However, time and effort are needed in order to collect abnormal data.

An example object of the invention is to provide an estimation apparatus, an estimation method, and a computer-readable storage medium for estimating a causal abnormality factor.

Solution to the Problems

To achieve the above-stated example object, an estimation apparatus according to an example aspect of the invention includes:

a normal index estimation unit configured to estimate, using a second variable output by a second component that influences a first variable output by a first component, first index information indicating that the first variable is achieved at a normal time; and an abnormality propagation information estimation unit configured to estimate abnormality propagation information expressing an index indicating that an abnormality propagates to a third variable output by a third component influenced by the first variable, by changing the first variable.

Also, to achieve the above-stated example object, an estimation method according to an example aspect of the invention includes:

(a) a step of estimating, using a second variable output by a second component that influences a first variable output by a first component, first index information indicating that the first variable is achieved at a normal time; and (b) a step of estimating abnormality propagation information representing an index indicating that an abnormality propagates to a third variable output by a third component influenced by the first variable, by changing the first variable.

Furthermore, to achieve the above-stated example object, a computer-readable recording medium according to an example aspect of the invention is a computer-readable recording medium that includes a program including instructions recorded thereon, the instructions causing a computer to carry out:

(a) a step of estimating, using a second variable output by a second component that influences a first variable output by a first component, first index information indicating that the first variable is achieved at a normal time; and (b) a step of estimating abnormality propagation information representing an index indicating that an abnormality propagates to a third variable output by a third component influenced by the first variable, by changing the first variable.

Advantageous Effects of the Invention

As described above, according to the invention, the causal abnormality factor can be estimated.

EXAMPLE EMBODIMENT

Example Embodiment

Hereinafter, an example embodiment of the invention will be described with reference to FIGS. 1 to 7.

[Apparatus Configuration]

Figure 1:
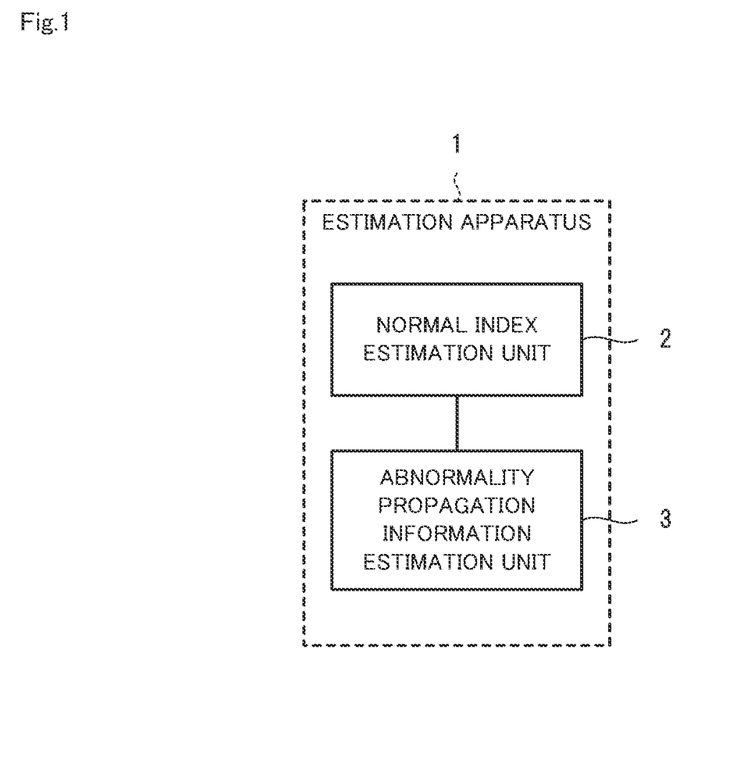
FIG. 1 is a diagram illustrating an example of an estimation apparatus.

First, the configuration of an estimation apparatus 1 according to the present example embodiment will be described using FIG. 1. FIG. 1 is a diagram illustrating an example of the estimation apparatus.

The estimation apparatus 1 shown in FIG. 1 is an apparatus that efficiently estimates a causal abnormality factor when an abnormality has occurred in a target system. The estimation apparatus 1 includes a normal index estimation unit 2 and an abnormality propagation information estimation unit 3, as shown in FIG. 1.

Here, the target system is an OT (Operation Technology) system to be used in a power station, a traffic facility, a factory, an airplane, an automobile, a home electric appliance, or the like, and includes a plurality of components, for example. The components are devices such as a sensor, an actuator, and the like that are provided in the target system, for example. Also, the components output a signal or information indicating pressure, a flow rate, temperature, voltage, current, or the like. The fact that an abnormality has occurred in a target system indicates that the target system has entered an abnormal state due to a cyber attack, failure, degradation, or the like.

Among these units, the normal index estimation unit 2 estimates, using an output value B (second variable) output from a component B (second component) that influences an output value A (first variable) output from a component A (first component), an index A (first index information) indicating whether the output value A is achieved at a normal time. The index A is an occurrence probability, a normality degree, or the like.

Specifically, the normal index estimation unit 2 receives, as an input, the output value B output from at least one component B that is in a causal relationship with the component A provided in the target system and influences the output value A output from the component A, and estimates the index A indicating whether the output value A is achieved after a predetermined time at a normal time.

The abnormality propagation information estimation unit 3 estimates abnormality propagation information expressing an index indicating that the abnormality propagates to an output value C (third variable) that is output from a component C (third component) and is influenced by the output value A, by changing the output value A.

Specifically, the abnormality propagation information estimation unit 3 estimates, using the index A, an index B (second index information) indicating whether the output value C output from the component C influenced by the component A is achieved after the predetermined time. The index B is an occurrence probability, a normality degree, or the like.

Also, the abnormality propagation information estimation unit 3 estimates an index C (third index information) indicating whether the output value C (third variable) is achieved after the predetermined time, using the index A and an output value A' (fourth variable) that has shifted from the output value A due to a change that occurred in the component A. The index C indicates an occurrence probability, a normality degree, or the like.

Moreover, the abnormality propagation information estimation unit 3 estimates an index D (abnormality propagation information) indicating that an abnormality propagates from the output value A to the output value C using the index B and the index C (occurrence probability B and occurrence probability C). That is, the abnormality propagation information estimation unit 3 estimates the index D indicating the propagation of an abnormality from the component A to the component C (first variable to third variable) using the influence on the component C exerted by a change that occurred in the component A (first variable to fourth variable).

As described above, according to the present example embodiment, when an abnormality has occurred in the target system, it is possible to estimate abnormality propagation probability information that indicates the causal effect, which is an index indicating that the abnormality propagates, using indices such as the aforementioned occurrence probabilities and normality degree. Therefore, the abnormality factor can be estimated for each component.

Also, according to the present example embodiment, the abnormality factor of a component can be estimated using the causal effect, and therefore, not only a known abnormality factor, but also an unknown abnormality factor can be specified.

Moreover, according to the present example embodiment, the normal index estimation unit 2 performs learning using output values output from a component at a normal time while not using output values output from the component at an abnormal time, and therefore output values at an abnormal time need not be collected. Therefore, time and effort can be reduced.

[System Configuration]

Figure 2:
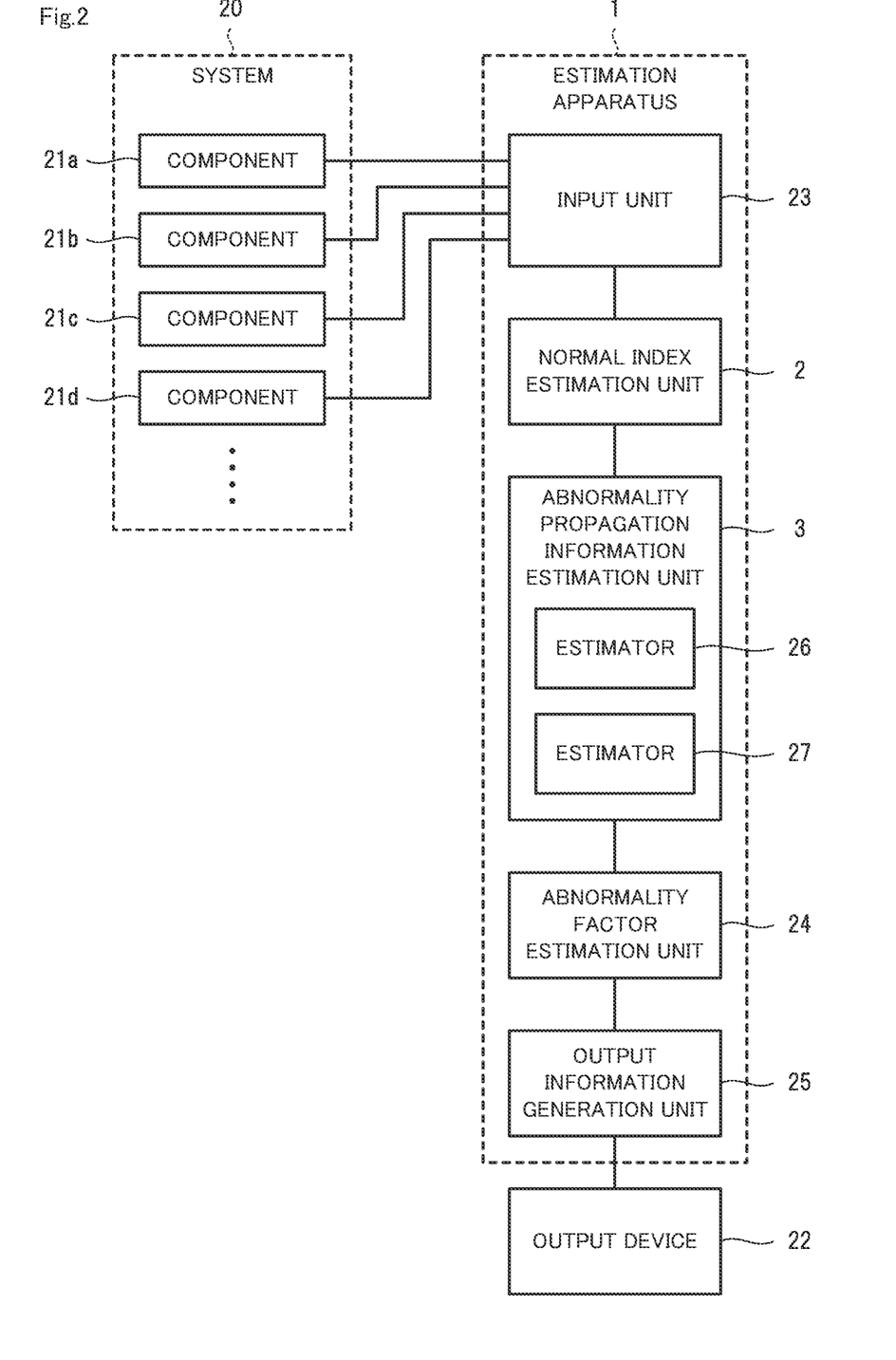
FIG. 2 is a diagram illustrating an example of a system including the estimation apparatus.

Next, the configuration of the estimation apparatus 1 according to the present example embodiment will be more specifically described using FIG. 2. FIG. 2 is a diagram illustrating an example of a system including the estimation apparatus 1.

As shown in FIG. 2, the estimation apparatus 1 according to the present example embodiment is connected to components 21 (21*a*, 21*b*, 21*c*, 21*d*, . . . , 21*n*) provided in a system 20 that is a target, and an output device 22. The estimation apparatus 1 includes, in addition to the normal index estimation unit 2 and the abnormality propagation information estimation unit 3, an input unit 23, an abnormality factor estimation unit 24, and an output information generation unit 25. The abnormality propagation information estimation unit 3 includes estimators 26 and 27.

The system 20 is a system including the components 21 and the like. The system 20 is an OT system, for example.

The components 21 (21a, 21b, 21c, 21d) are devices such as sensors and actuators provided in the system 20, for example.

The output device 22 acquires later-described output information that has been converted into an outputtable format by the output information generation unit 25, and outputs generated images, sounds, and the like based on the output information. The output device 22 is an image display device using liquid crystal, organic EL (Electro Luminescence), or a CRT (Cathode Ray Tube), for example. Moreover, the image display device may also include an audio output device such as a speaker. Note that the output device 22 may also be a printing device such as a printer.

The estimation apparatus 1 will be described in more detail.

The input unit 23 acquires output values in time series from each component 21. Specifically, in a learning phase, the input unit 23 acquires normal output values in time series from each component 21. Also, in an operation phase, the input unit 23 acquires output values (real data) output from the respective components 21.

In the operation phase, the normal index estimation unit 2 receives an output value B (causal explanatory variable) of one component 21 that influences an output value A of another component 21, and estimates the index A indicating whether the output value A (resultant objective variable) is achieved after the predetermined time at a normal time.

Specifically, the normal index estimation unit 2 is an estimator that, in the operation phase, receives an explanatory variable as an input, and outputs an index indicating whether an objective variable is achieved after the predetermined time at a normal time. In the learning phase, the estimator performs machine learning such that, at a normal time, the explanatory variable is received as an input, and an index expressing an occurrence probability, a normality degree, or the like is output.

Note that the normality degree is modeled, in any model, such that the value increases as the state approaches the normal state. For example, the difference between the input and output of an autoencoder (AE) or the like can be used.

Also, the estimator is modeled such that learning is performed by machine learning such as a neural network (deep learning). The estimator may also use a probabilistic neural network (generation model). For example, a model such as DBM (Deep Boltzmann Machine), DBN (Deep Belief Network), VAE (Variational Autoencoder), GAN (Generative Adversarial Network), or DeepGMM (Gaussian Mixture Model) may be used. Moreover, the estimator may also use a perceptron, a kernel support vector machine, a decision tree, a hierarchical Bayesian model, stochastic process regression, or the like.

The normal index estimation unit 2 will be described in more detail.

In the example in FIG. 2, first, the normal index estimation unit 2 obtains, regarding the component 21a provided in the system 20, at least one component 21 that influences the output value output from the component 21a, that is to say is in a causal relationship with the component 21a. Also, regarding each of the components 21b, 21c, and 21d as well, at least one component 21 in a causal relationship is obtained.

The meaning of the aforementioned causal relationship is as follows. If an output value $x_a$ output from the component 21a is influenced by output values $x_b$, $x_c$, and $x_d$ of the components 21b, 21c, and 21d, the output value $x_a$ of the component 21a is in causal relationship with the output values $x_b$, $x_c$, and $x_d$ of the components 21b to 21d.

Specifically, assume that the components 21a and 21b are heaters 1 and 2, the component 21c is a temperature sensor 1 that measures the temperature of the heater 1, and the component 21d is a temperature sensor 2 that measures the temperature of the heater 2, and assume that in this case, the heater 1 is provided in the vicinity of the heater 2. In such a case, the output values of the heaters 1 and 2 and the output values of the temperature sensors 1 and 2 influence each other, and therefore this relationship is called a causal relationship.

Next, at a time of operation, the normal index estimation unit 2 receives output values $x_b$, $x_c$, and $x_d$ (explanatory variables) that influence the output value $x_a$ output from the component 21a, and estimates an index A indicating whether the output value $x_a$ (objective variable) is achieved after the predetermined time at a normal time. Also, with respect to the output values $x_b$, $x_c$, and $x_d$ of the components 21b to 21d, the normal index estimation unit 2 estimates the index A for each of the output values $x_b$, $x_c$, and $x_d$.

For example, the normal index estimation unit 2 outputs the index A indicating that, when the output values $x_b$, $x_c$, and $x_d$ of the components 21b to 21d that influence the output value $x_a$ of the component 21a are determined, the output value of the component 21a becomes $x_a$ after the predetermined time at a normal time.

When the output value of a component is a continuous value, for example, a probability distribution parameter such as a Gaussian distribution, a Gaussian mixture model, a beta distribution, or a gamma distribution is used as the index A described above. Also, when the output value of a component is a discrete value, a probability distribution value such as a binomial distribution or a multinomial distribution is used. Note that, when a generation model is used, the definition of a specific distribution may not be needed as the index.

In an operation phase, the abnormality propagation information estimation unit 3 acquires the index A of a component 21 estimated by the normal index estimation unit 2 at a normal time. Next, the abnormality propagation information estimation unit 3 estimates, using the index A acquired from the normal index estimation unit 2, the index B indicating whether the output value, at a normal time, of another component 21 influenced by the component 21 is achieved after the predetermined time.

Specifically, the abnormality propagation information estimation unit 3 includes an estimator 26. In an operation phase, the estimator 26 receives the index A estimated by the normal index estimation unit 2 (e.g., occurrence probability p(x) and output value $x_n$ itself), and outputs the index B indicating whether an output value (y) of another component 21 causally influenced by the output value $x_n$ of the component 21 is achieved after the predetermined time.

In a learning phase, the estimator 26 performs machine learning such that, at a normal time, the index A estimated by the normal index estimation unit 2 and an output value $x_n$ are received, and the index B indicating that the output value of another component 21 causally influenced by the component 21 becomes (y) after the predetermined time is output. Alternatively, the model of the normal index estimation unit 2 is used as is.

For example, the estimator 26 of the abnormality propagation information estimation unit 3 receives the index A (occurrence probability p (x)) and the output $x_a$ of the component 21a as inputs, and outputs the indices B (parameters of occurrence probabilities $p(y_b|x_a)$, $p(y_c|x_a)$, and $p(y_d|x_a)$) indicating that the output values of the other components 21b to 21d influenced by the output value $x_a$ of the component 21a respectively become $(y_b)$, $(y_c)$, and $(y_d)$ after the predetermined time.

Also, in an operation phase, the abnormality propagation information estimation unit 3 estimates, using the index A acquired from the normal index estimation unit 2 and an output value obtained due to shifting of the output value of one component 21 due to a change occurring therein, the index C indicating whether the output value, at a normal time, of another component 21 is achieved after the predetermined time.

Specifically, in the operation phase, if the index A estimated by the normal index estimation unit 2 is a parameter of the occurrence probability $p(x)$, the abnormality propagation information estimation unit 3 determines $x_n'$ obtained by virtually changing, according to the index A, the actual output value $x_n$ of the component 21 according to the index A. Also, the estimator 27 included in the abnormality propagation information estimation unit 3 receives the index A ($p(x)$) and $x_n'$ as inputs, and outputs the index C indicating whether the output value (y), at a normal time, of the other component 21 is achieved after the predetermined time.

In the learning phase, the estimator 27 performs machine learning such that the index $p(x)$ and $x_n'$ are received as inputs, and the index C indicating whether the output value, at a normal time, of the other component 21 is achieved after the predetermined time is output. Alternatively, the index C is output using a copy of the model of the normal index estimation unit 2.

For example, the estimator 27 of the abnormality propagation information estimation unit 3 estimates, using a output value $x_a'$ obtained by virtually shifting the output value $x_a$ of the component 21a, the indices C (occurrence probabilities $p(y_b|x_a')$, $p(y_c|x_a')$, and $p(y_d|x_a')$) indicating that output values of the other components 21b to 21d that are influenced by the output value $x_a$ of the component 21a respectively become $(y_b)$, $(y_c)$, and $(y_d)$ after the predetermined time.

Note that the estimators 26 and 27 described above are modeled such that learning is performed by machine learning such as a neural network (deep learning). Also, it is also possible that the model obtained by learning performed in the normal index estimation unit 2 is copied and used as is. The estimators may also use a probabilistic neural network (generation model). For example, a model such as DBM, DBN, VAE, GAN, or DeepGMM may be used. Moreover, the estimators may use a perceptron, a kernel support vector machine, a decision tree, a hierarchical Bayesian model, stochastic process regression, or the like.

Next, in an operation phase, the abnormality propagation information estimation unit 3 estimates a causal effect using the aforementioned two indices B and C. In other words, the abnormality propagation information estimation unit 3 estimates the index D indicating the influence exerted by the change occurring in the output value of one component 21 due to abnormality on the output value of another component 21, that is, the index D (abnormality propagation information) indicating that abnormality propagates.

Specifically, the abnormality propagation information estimation unit 3 estimates the index D (abnormality propagation information) indicating that abnormality propagates, as shown in Math. 1, for example.

$$\frac{\int p(y|x_n) \log \frac{p(y|x_n)}{p(y|x_n')} dy}{\log p(x_n) - \log p(x_n')} \quad \text{[Math. 1]}$$

$x_n$: output value of a target component
$x_n'$: output value shifted from an output value of a target component
y: output value of each component causally influenced by $x_n$ Note that a configuration may also be adopted in which a plurality of values $x_n'$ are generated by shifting the output value $x_n$, and an average value of the indices D estimated using the plurality of values $x_n'$ is regarded as the ultimate estimation result of the index D. This method gives a robust estimation result with respect to how $x_n$ is shifted. Also, Kullback-Leibler divergence or another index may also be used as the numerator of Math. 1.

For example, when estimating abnormality propagation information of the component 21a, the abnormality propagation information estimation unit 3, estimates the indices D (abnormality propagation information) indicating the influence exerted by the change occurring in the output value of the component 21a due to abnormality on the output values of the other components 21b to 21d, using the occurrence probabilities $p(y_b|x_a)$, $p(y_c|x_a)$, and $p(y_d|x_a)$ indicating the indices B described above and the occurrence probabilities $p(y_b|x_a')$, $p(y_c|x_a')$, $p(y_d|x_a')$ indicating the indices C described above.

As described above, the abnormality propagation information estimation unit 3 estimates, with respect to each of the components 21a to 21d, the abnormality propagation information regarding a component 21 on which influence is exerted by each of the components 21a to 21d.

In an operation phase, the abnormality factor estimation unit 24 receives the abnormality propagation information estimated by the abnormality propagation information estimation unit 3 as an input, and estimates the abnormality factor information of each component 21 provided in the target system 20 using logical inference or Bayesian processing. Specifically, the abnormality factor estimation unit 24 is an estimator that receives abnormality propagation information as an input, and outputs abnormality factor information of each component 21. The Bayesian processing is processing such as a Bayesian network or naive Bayes.

For example, first, the abnormality factor estimation unit 24, sets an abnormality factor estimation time for estimating the abnormality factor of the components 21. Next, the abnormality factor estimation unit 24 can set a prior probability of becoming an abnormality factor as the output value (variable) of each component 21 as an initial value. For example, with respect to a component that can be easily damaged and a component vulnerable to cyber attack, a high prior probability is set. On the other hand, for a robust component that is unlikely to be a fundamental factor of abnormality, a low prior probability is set.

As a result of setting the prior probability, the estimation accuracy of the abnormality factor is expected to be improved, but if the setting is not needed, the same value may be set as the prior probability of each of all the components.

Then, the abnormality factor estimation unit 24 receives the index D (abnormality propagation information) as an input, and estimates the abnormality factor (abnormality factor information) of each component 21 provided in the system 20 in the abnormality factor estimation time. That is, the probability (abnormality factor probability) that a fundamental abnormality occurred in each component 21 is calculated for each point in time of the abnormality factor estimation time.

Figure 3:
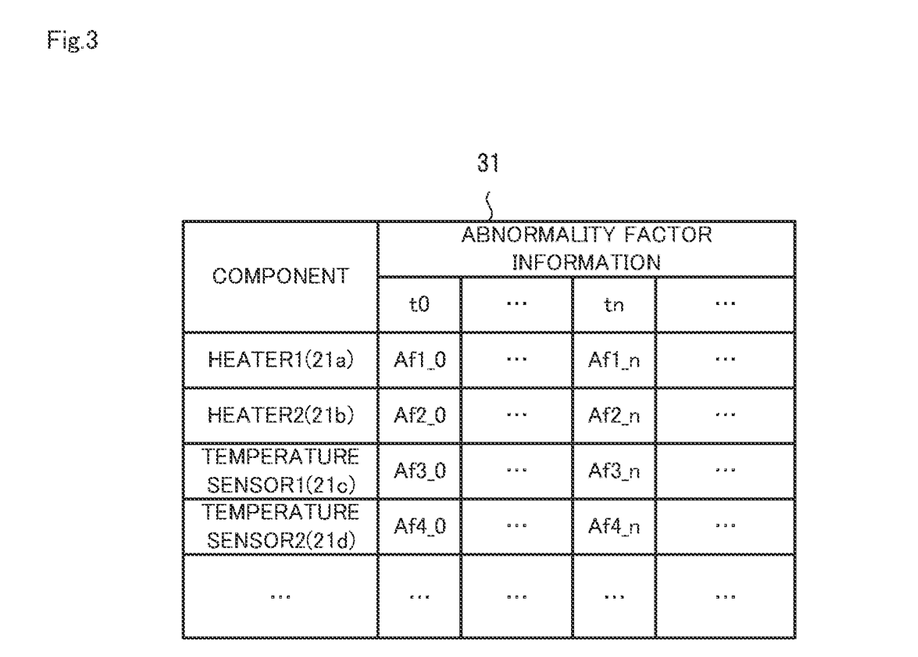
FIG. 3 is a diagram illustrating an example of a data structure of abnormality factor data.

FIG. 3 is a diagram illustrating an example of a data structure of the abnormality factor data. In the abnormality factor data shown in FIG. 3, pieces of identification information "heater 1", "heater 2", "temperature sensor 1", and "temperature sensor 2" indicating respective components 21 are associated with pieces of abnormality factor information ("af1_0" ... "af1_$n$" ... , "af2_0" ... "af2_$n$" ... "af3_0" ... "af3_$n$" ... "af4_0" ... "af4_$n$" ... ) estimated at respective points in time ("t0" ... "tn" ... ) in the abnormality factor estimation time.

The output information generation unit 25 generates output information for output to the output device 22 using the pieces of abnormality factor data of the respective components 21 at each point in time in the abnormality factor estimation time. Specifically, the output information generation unit 25 generates output information for outputting, to the output device 22, a graph shown in FIG. 4, a matrix shown in FIG. 3, a maximum value and a ranking of the abnormality factor in the abnormality factor estimation time, and the like.

Figure 4:
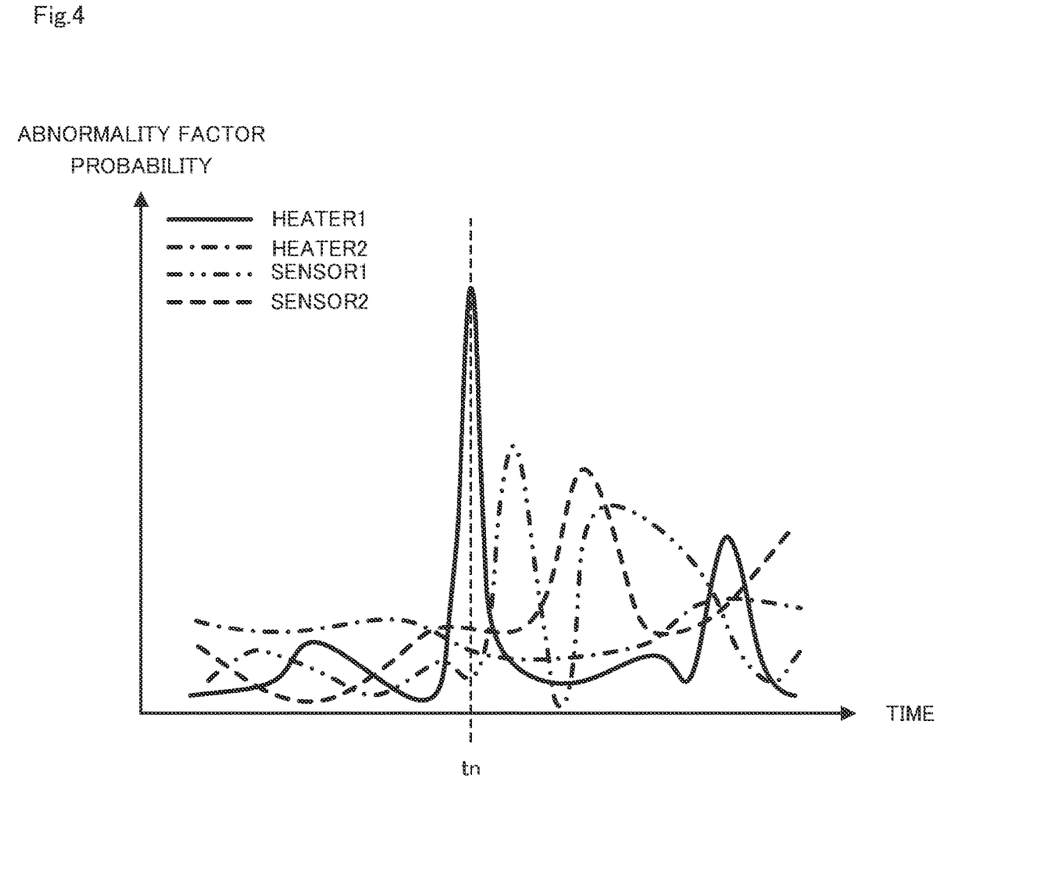
FIG. 4 is a diagram for describing the relationship between components and abnormality factor information.

FIG. 4 is a diagram for describing the relationship between the components and the abnormality factor information. In the example in FIG. 4, the vertical axis shows the abnormality factor information and the horizontal axis shows time. Also, the abnormality factor information of the heater 1 indicates a large value at time tn.

[Apparatus Operations]

Figure 5:
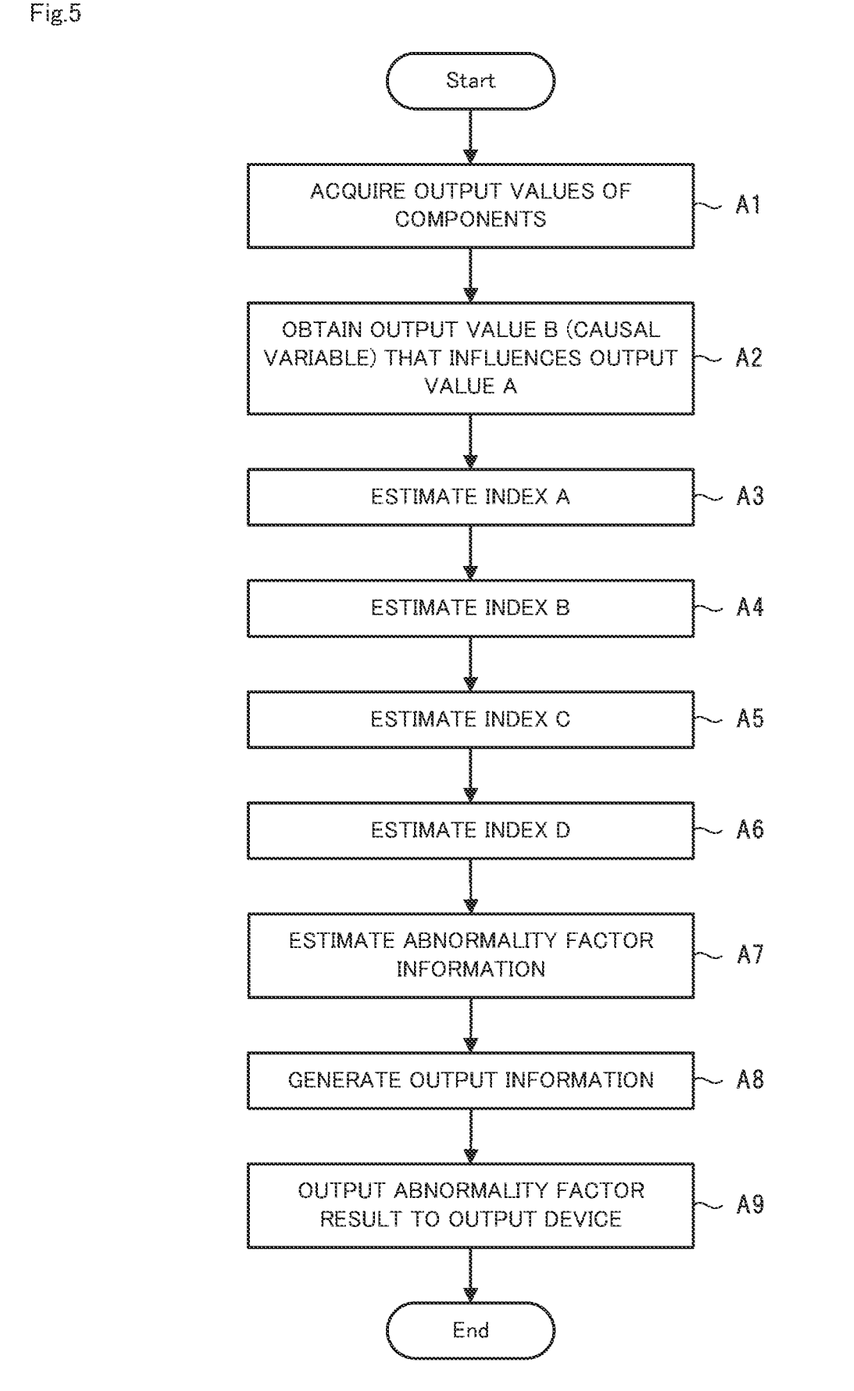
FIG. 5 is a diagram illustrating an example of operations of the estimation apparatus.

Next, the operations of the estimation apparatus 1 according to the example embodiment of the invention will be described using FIG. 5. FIG. 5 is a diagram illustrating an example of operations of the estimation apparatus. In the following description, FIGS. 1 to 4 will be referred to as appropriate. Furthermore, in the present example embodiment, the estimation method is carried out by causing the estimation apparatus 1 to operate. Therefore, the following description of the operations of the estimation apparatus 1 applies to the estimation method according to the present example embodiment.

As shown in FIG. 5, first, the input unit 23 acquires output values in time series from each component 21 (step A1). Specifically, in step A1, the input unit 23 acquires output values (real data) respectively output from the components 21.

Next, the normal index estimation unit 2 obtains, regarding each component 21 provided in the system 20, at least one component 21 that influences the output value A output from the component 21, that is, in a causal relationship with the component 21 (step A2).

Next, the normal index estimation unit 2 receives the output value B (causal explanatory variable) that influences the output value A of the component 21 as an input, and estimates the index A indicating whether the output value A (resultant objective variable) of the component 21 is achieved after the predetermined time at a normal time (step A3). Specifically, in step A3, the normal index estimation unit 2 receives the explanatory variable as an input, and outputs an index indicating whether the objective variable is achieved after the predetermined time at a normal time.

For example, in step A3, the normal index estimation unit 2 receives output values $x_b$, $x_c$, and $x_d$ (causal explanatory variables) that influence an output value $x_a$ output from the component 21a as inputs, and estimates the index A indicating whether the output value $x_a$ (resultant objective variable) is achieved after the predetermined time at a normal time. Also, the normal index estimation unit 2 estimates the indices A for the respective output values $x_b$, $x_c$, and $x_a$, with respect to the output values $x_b$, $x_c$, and $x_a$ of the components 21b to 21d.

Next, the abnormality propagation information estimation unit 3 estimates the index B indicating whether the output value, at a normal time, of another component 21 that is influenced by one component 21 is achieved after the predetermined time, using the index A acquired from the normal index estimation unit 2 (step A4).

Specifically, in step A4, the abnormality propagation information estimation unit 3 receives the index A (e.g., occurrence probability p(x)) estimated by the normal index estimation unit 2 and the output value $x_n$ as inputs, and outputs the index B indicating whether the output value (y) of another component 21 that is causally influenced by the output value $x_n$ of the component 21 is achieved after the predetermined time.

For example, in step A4, the estimator 26 of the abnormality propagation information estimation unit 3 receives the index A (occurrence probability p(x)) of the component 21a and the output value $x_n$ as inputs, and outputs the index B (occurrence probabilities $p(y_b|x_a)$, $p(y_c|x_a)$, $p(y_d|x_a)$) indicating that the output values of the other components 21b to 21d that are influenced by the output value $x_a$ of the component 21a respectively become ($y_b$), ($y_c$), and ($y_d$) after the predetermined time.

Next, the abnormality propagation information estimation unit 3 estimates the index C indicating whether the output value of another component 21 at a normal time is achieved after the predetermined time, using the index A acquired from the normal index estimation unit 2 and an output value obtained by shifting the output value due to change occurring in one component 21 (step A5).

Specifically, in step A5, the abnormality propagation information estimation unit 3, if the index A estimated by the normal index estimation unit 2 is the occurrence probability p(x), generates $x_n$' by shifting the output value $x_n$ of one component 21 according to the index A. Then, the estimator 27 included in the abnormality propagation information estimation unit 3 receives indices (p(x) and $x_n$') as an input, and outputs the index C indicating whether the output value (y), at a normal time, of another component 21 is achieved after the predetermined time.

For example, in step A5, the estimator 27 of the abnormality propagation information estimation unit 3 estimates the index C (occurrence probabilities $p(y_b|x_a')$, $p(y_c|x_a')$, $p(y_d|x_a')$) indicating that the output values of the other components 21b to 21d that are influenced by the output value $x_a$ of the component 21a respectively become ($y_b$), ($y_c$), and ($y_d$) after the predetermined time, using the output value $x_a$' obtained by virtually shifting the output value $x_a$ of the component 21a.

Next, the abnormality propagation information estimation unit 3 estimates the index D indicating the causal effect using the indices B and C (step A6). In other words, in step A6, the abnormality propagation information estimation unit 3 estimates the influence exerted by the change occurring in the output value of one component 21 due to abnormality on the output value of another component 21, that is, the index D (abnormality propagation information) indicating that an abnormality propagates.

Specifically, in step A6, the abnormality propagation information estimation unit 3 estimates the index D (abnormality propagation information) indicating that an abnormality propagates, as shown in Math. 1.

For example, in step A6, when estimating the abnormality propagation information regarding the component 21*a*, the abnormality propagation information estimation unit 3 estimates the indices D (abnormality propagation information) indicating the influence to be exerted by the change occurring in the output value of the component 21*a* due to abnormality on the respective output values of the other components 21*b* to 21*d*, using the occurrence probabilities $p(y_b|x_a)$, $p(y_c|x_a)$, and $p(y_d|x_a)$ indicating the indices B described above and the occurrence probabilities $p(y_b|x_a')$, $p(y_c|x_a')$, and $p(y_a|x_a')$ indicating the indices C described above.

Next, the abnormality factor estimation unit 24 receives the abnormality propagation information estimated by the abnormality propagation information estimation unit 3 as an input, and estimates abnormality factor information for each component 21 provided in the target system 20 using logical inference or Bayesian processing (step A7).

Specifically, in step A7, the abnormality factor estimation unit 24 receives the abnormality propagation information as an input, and outputs the abnormality factor information for each component 21 using Bayesian processing such as the Bayesian network or naive Bayes, for example.

For example, in step A7, first, the abnormality factor estimation unit 24 sets an abnormality factor estimation time for estimating the abnormality factor of the components 21. Next, the abnormality factor estimation unit 24 sets a prior probability of becoming an abnormality factor as the output values (variables) of each component 21 as an initial value. Then, the abnormality factor estimation unit 24 receives the index D (abnormality propagation information) as an input, and estimates the abnormality factor information for each component 21 provided in the system 20 in the abnormality factor estimation time.

Next, the output information generation unit 25 generates output information for outputting to the output device 22 using abnormality factor data of each component 21 at each point in time in the abnormality factor estimation time (step A8). Specifically, in step A8, the output information generation unit 25 generates output information for outputting, to the output device 22, a graph shown in FIG. 4, a matrix shown in FIG. 3, a maximum value and a ranking of the abnormality factor in the abnormality factor estimation time, and the like.

Next, the output device 22 acquires the output information from the output information generation unit 25, and outputs an abnormality factor result (step A9). Refer to FIGS. 3 and 4.

Effects According to Example Embodiment

As described above, according to the present example embodiment, when an abnormality has occurred in a target system, the abnormality propagation information indicating a causal effect that is an index indicating that the abnormality propagates can be estimated using indices such as the occurrence probability and normality degree described above. Therefore, the abnormality factor for each component can be estimated.

Figure 6:
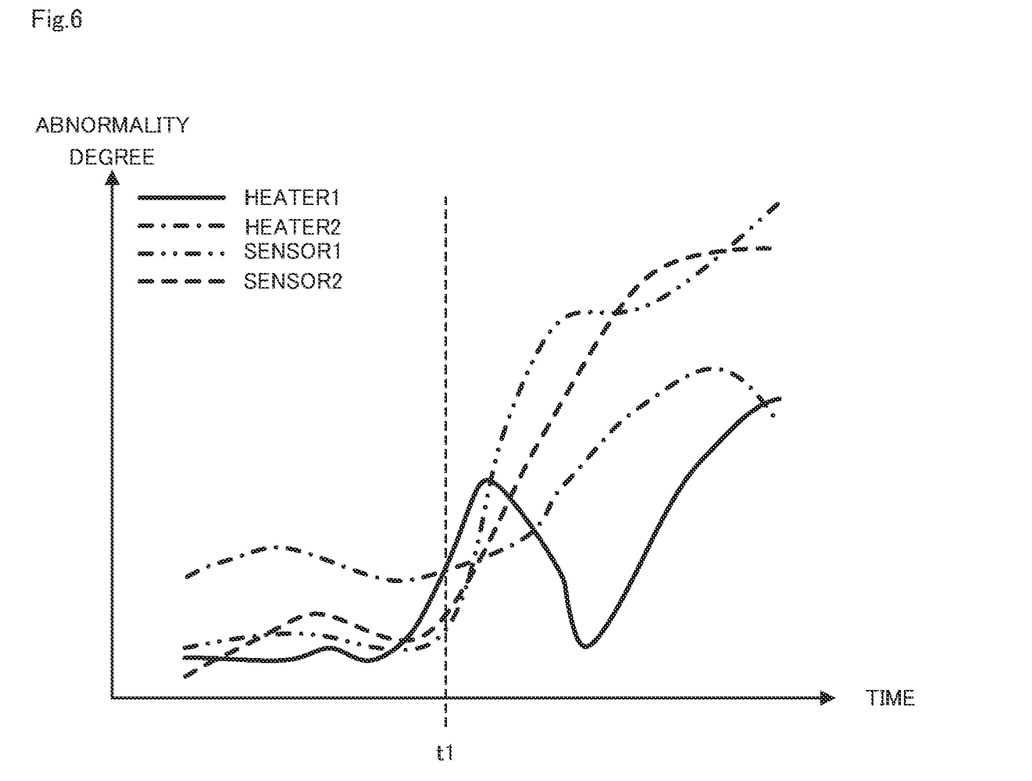
FIG. 6 is a diagram for describing the relationship between components and abnormality degrees.

FIG. 6 is a diagram for describing the relationship between components and abnormality degrees. When the relationship between output values of the components 21 are shown using the abnormality degrees as shown in FIG. 6, as in a known technique, the component 21 to be an abnormality factor cannot be estimated from the abnormality degree of each component 21. That is, in the example in FIG. 6, it cannot be determined which of the heaters 1 and 2 and temperature sensors 1 and 2 is the abnormality factor. The abnormality degree is a value calculated based on the occurrence probability of an output value of each component 21 in a normal state, or the like. The abnormality degree is a correlation probability or the like.

However, according to the present example embodiment, the abnormality factor probability of the heater 1 increases at time tn, as shown in FIG. 4, and therefore the component 21*a* that is the abnormality factor and the time at which an abnormality has occurred can be estimated.

Also, according to the present example embodiment, the abnormality factor of a component can be estimated using the causal effect, and therefore not only a known abnormality factor can be specified, but also an unknown abnormality factor can be specified.

Also, according to the present example embodiment, the normal index estimation unit 2 performs learning using output values output from a component at a normal time while not using output values output from the component at an abnormal time, and therefore the output values at an abnormal time need not be collected. Therefore, a user can save time and effort.

The abnormality factor information to be an abnormality factor of a component provided in a target system can be estimated by receiving abnormality propagation information as an input and using the Bayesian processing, and therefore the causal abnormality factor can be efficiently estimated.

[Program]

A program according to the present example embodiment need only be a program for causing a computer to perform steps A1 to A9 shown in FIG. 5. The estimation apparatus and the estimation method according to the present example embodiment can be realized by installing this program on a computer and executing the program. In this case, a processor of the computer functions as the input unit 23, the normal index estimation unit 2, the abnormality propagation information estimation unit 3, the abnormality factor estimation unit 24, and the output information generation unit 25, and performs processing.

Also, the program according to the present example embodiment may also be executed by a computer system that includes a plurality of computers. In this case, for example, each of the computers may function as any of the input unit 23, the normal index estimation unit 2, the abnormality propagation information estimation unit 3, the abnormality factor estimation unit 24, and the output information generation unit 25.

[Physical Configuration]

Figure 7:
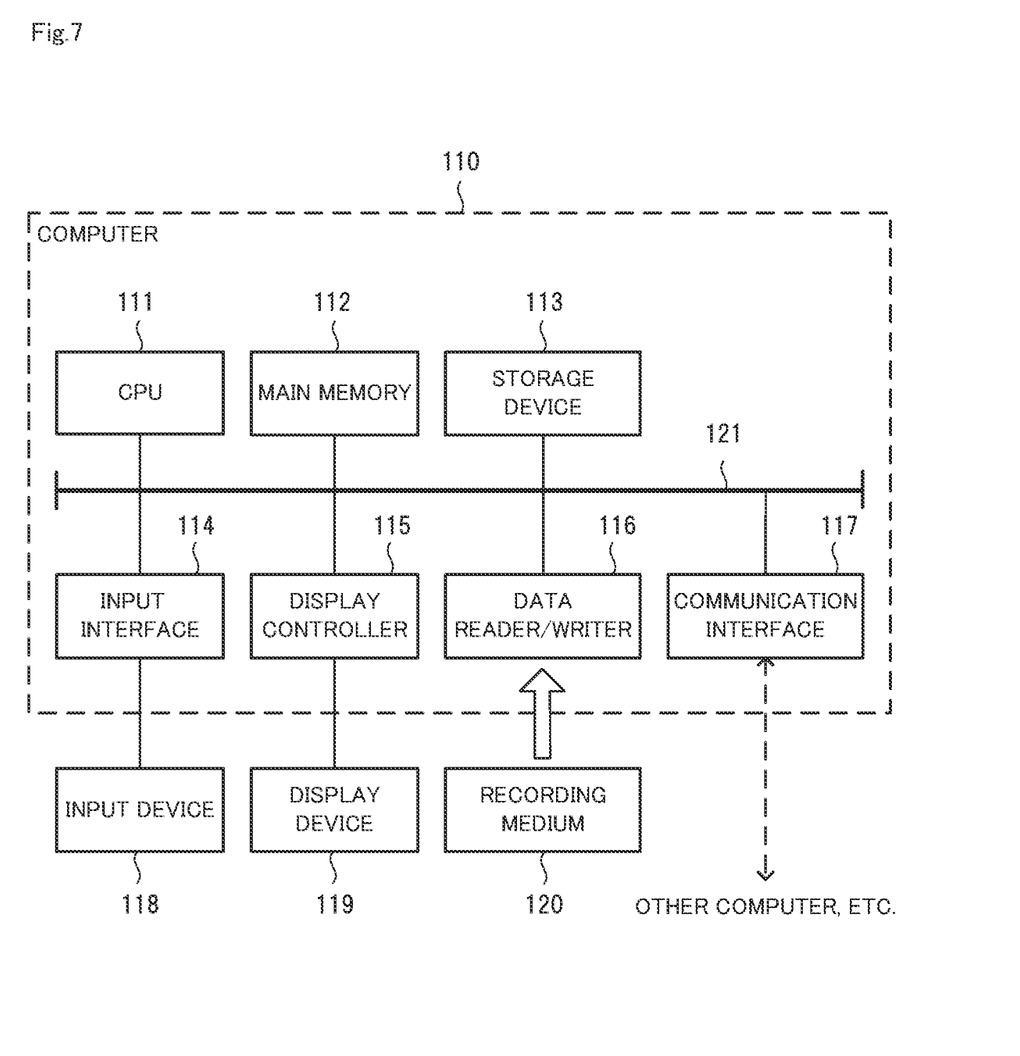
FIG. 7 is a diagram illustrating an example of a computer that realizes the estimation apparatus.

A description will now be given, with reference to FIG. 7, of a computer that realizes the estimation apparatus 1 by executing the program according to the present example embodiment. FIG. 7 is a diagram illustrating an example of a computer that realizes the estimation apparatus.

As shown in FIG. 7, a computer 110 includes a CPU 111, a main memory 112, a storage device 113, an input interface 114, a display controller 115, a data reader/writer 116, and a communication interface 117. These units are connected to each other via a bus 121 so as to be able to communicate data. Note that the computer 110 may also include, in addition to the CPU 111 or in place of the CPU 111, a GPU (Graphics Processing Unit), or an FPGA (Field-Programmable Gate Array).

The CPU 111 loads the program (codes) according to the present example embodiment that is stored in the storage device 113 to the main memory 112 and executes the program in a predetermined order, thereby performing various kinds of computation. The main memory 112 is typically a volatile storage device such as a DRAM (Dynamic Random Access Memory). The program according to the present example embodiment is provided in a state of being stored in a computer-readable recording medium 120. Note that the program according to the present example embodiment may also be distributed on the Internet to which the computer is connected via the communication interface 117.

Specific examples of the storage device 113 may include a hard disk drive, a semiconductor storage device such as a flash memory, and the like. The input interface 114 mediates data transmission between the CPU 111 and input devices 118 such as a keyboard and a mouse. The display controller 115 is connected to a display device 119 and controls a display in the display device 119.

The data reader/writer 116 mediates data transmission between the CPU 111 and the recording medium 120, reads out the program from the recording medium 120, and writes, in the recording medium 120, the results of processing performed by the computer 110. The communication interface 117 mediates data transmission between the CPU 111 and other computers.

Specific examples of the recording medium 120 may include a general-purpose semiconductor storage device such as a CF (Compact Flash (registered trademark)) or an SD (Secure Digital), a magnetic recording medium such as a Flexible Disk, and an optical recording medium such as a CD-ROM (Compact Disk Read Only Memory).

Note that the estimation apparatus 1 according to the present example embodiment is also realizable by using hardware corresponding to the respective units, rather than by a computer on which programs are installed. Furthermore, the estimation apparatus 1 may be realized in part by programs, and the remaining portion may be realized by hardware.

[Supplementary Note]

In relation to the above example embodiment, the following Supplementary Notes are further disclosed. Part of, or the entire present example embodiment described above can be expressed by the following (Supplementary note 1) to (Supplementary note 15), but is not limited thereto.

(Supplementary Note 1)

An estimation apparatus including:

a normal index estimation unit configured to estimate, using a second variable output by a second component that influences a first variable output by a first component, first index information indicating that the first variable is achieved at a normal time; and an abnormality propagation information estimation unit configured to estimate abnormality propagation information expressing an index indicating that an abnormality propagates to a third variable output by a third component influenced by the first variable, by changing the first variable.

(Supplementary Note 2)

The estimation apparatus according to supplementary note 1, further including:

an abnormality factor estimation unit configured to receive the abnormality propagation information as an input, and estimate abnormality factor information regarding an abnormality factor of a component provided in a target system.

(Supplementary note 3)

The estimation apparatus according to supplementary note 1 or 2, wherein the normal index estimation unit receives, as an input, a second variable that influences the first variable output by the first component and is output by at least one second component that is in a causal relationship with the first component, and estimates the first index information expressing an index indicating that the first variable is achieved after a predetermined time at a normal time, and the abnormality propagation information estimation unit estimates second index information expressing an index indicating that the third variable is achieved output by the third component influenced by the first component after a predetermined time using the first index information, estimates third index information expressing an index indicating that the third variable is achieved after a predetermined time, using a fourth variable obtained by shifting the first variable, and estimates the abnormality propagation information expressing an index indicating that an abnormality propagates from the first variable to the third variable using the second index information and the third index information.

(Supplementary Note 4)

The estimation apparatus according to supplementary note 3, wherein the first to third index information are each an occurrence probability or a normality degree.

(Supplementary Note 5)

The estimation apparatus according to supplementary note 2, wherein the abnormality factor estimation unit estimates the abnormality factor information using Bayesian processing.

(Supplementary Note 6)

An estimation method including:

(a) a step of estimating, using a second variable output by a second component that influences a first variable output by a first component, first index information indicating that the first variable is achieved at a normal time; and (b) a step of estimating abnormality propagation information expressing an index indicating that an abnormality propagates to a third variable output by a third component influenced by the first variable, by changing the first variable.

(Supplementary Note 7)

The estimation method according to supplementary note 6, further including:

(c) a step of receiving the abnormality propagation information as an input, and estimating abnormality factor information regarding an abnormality factor of a component provided in a target system.

(Supplementary Note 8)

The estimation method according to supplementary note 6 or 7, wherein, in the (a) step, a second variable that influences the first variable output by the first component and is output by at least one second component that is in a causal relationship with the first component is received as an input, and the first index information that expresses an index indicating that the first variable is achieved after a predetermined time at a normal time is estimated, and in the (b) step, second index information that expresses an index indicating that the third variable is achieved output by the third component influenced by the first component after a predetermined time is estimated using the first index information and the third variable, third index information that expresses an index indicating that the third variable is achieved after a predetermined time is estimated using a fourth variable obtained by shifting the first variable, and the abnormality propagation information that expresses an index indicating that an abnormality propagates from the first variable to the third variable is estimated using the second index information and the third index information.

(Supplementary Note 9)

The estimation method according to supplementary note 8, wherein the first to third index information are each an occurrence probability or a normality degree.

(Supplementary Note 10)

The estimation method according to supplementary note 7, wherein, in the (c) step, the abnormality factor information is estimated using Bayesian processing.

(Supplementary Note 11)

A computer-readable recording medium that includes a program including instructions recorded thereon, the instructions causing a computer to carry out:

(a) a step of estimating, using a second variable output by a second component that influences a first variable output by a first component, first index information indicating that the first variable is achieved at a normal time; and (b) a step of estimating abnormality propagation information expressing an index indicating that an abnormality propagates to a third variable output by a third component influenced by the first variable, by changing the first variable.

(Supplementary Note 12)

The computer readable recording medium that includes the program according to supplementary note 11 recorded thereon, the program further including instructions that causes the computer to carry out:

(c) a step of receiving the abnormality propagation information as an input, and estimating abnormality factor information regarding an abnormality factor of a component provided in a target system.

(Supplementary Note 13)

The computer readable recording medium according to supplementary note 11 or 12, wherein, in the (a) step, a second variable that influences the first variable output by the first component and is output by at least one second component that is in a causal relationship with the first component is received as an input, and the first index information that expresses an index indicating that the first variable is achieved after a predetermined time at a normal time is estimated, and in the (b) step, second index information that expresses an index indicating that the third variable is achieved output by the third component influenced by the first component after a predetermined time is estimated using the first index information and the third variable, third index information that expresses an index indicating that the third variable is achieved after a predetermined time is estimated, using a fourth variable obtained by shifting the first variable, and the abnormality propagation information that expresses an index indicating that an abnormality propagates from the first variable to the third variable is estimated using the second index information and the third index information.

(Supplementary Note 14)

The computer readable recording medium according to supplementary note 13 that includes the program recorded thereon, wherein the first to third index information are each an occurrence probability or a normality degree.

(Supplementary Note 15)

The computer readable recording medium according to supplementary note 12, wherein, in the (c) step, the abnormality factor information is estimated using Bayesian processing.

The invention of the present application has been described above with reference to the present example embodiment, but the invention of the present application is not limited to the above present example embodiment. The configurations and the details of the invention of the present application may be changed in various manners that can be understood by a person skilled in the art within the scope of the invention of the present application.

INDUSTRIAL APPLICABILITY

As described above, according to the invention, a causal abnormality factor of a component provided in a system can be estimated. The invention is useful in fields in which a causal abnormality factor needs to be estimated.

LIST OF REFERENCE SIGNS

1 Estimation apparatus
2 Normal index estimation unit
3 Abnormality propagation information estimation unit
20 System
21, 21a, 21b, 21c, 21d Component
22 Output device
23 Input unit
24 Abnormality factor estimation unit
25 Output information generation unit
26, 27 Estimator
31 Abnormality factor data
110 Computer
111 CPU
112 Main memory
113 Storage device
114 Input interface
115 Display controller
116 Data reader/writer
117 Communication interface
118 Input devices
119 Display device
120 Recording medium
121 Bus

What is claimed is:

1. An estimation apparatus comprising:
a processor; and
a memory storing instructions executable by the processor to:
receive, as input, a second variable that influences a first variable output by a first component, wherein the second variable is output by a second component that is in a causal relationship with the first component;
estimate, using the second variable, first index information indicating that the first variable is achieved after a predetermined time at a normal time;
estimate second information indicating that a third variable output by a third component influenced by the first variable is achieved after the predetermined time, using the first index information;

estimate third index information indicating that the third variable is achieved after the predetermined time, using a fourth variable obtained by shifting the first variable;

estimate abnormality propagation information expressing an index indicating that an abnormality propagates to the third variable, by changing the first variable, estimate abnormality factor information regarding an abnormality factor of a component in a target system based on the abnormality propagation information; and restore the target system based on an abnormal state to resolve the abnormality factor that caused the target system to enter the abnormal state, based on the abnormality factor information that has been estimated.

2. The estimation apparatus according to claim 1, wherein the first to third index information are each an occurrence probability or a normality degree.

3. The estimation apparatus according to claim 1, wherein the abnormality factor information is estimated using Bayesian processing.

4. An estimation method comprising:

receiving, as input, a second variable that influences a first variable output by a first component, wherein the second variable is output by a second component that is in a causal relationship with the first component;

estimating, using the second variable, first index information indicating that the first variable is achieved after a predetermined time at a normal time;

estimating second information indicating that a third variable output by a third component influenced by the first variable is achieved after the predetermined time, using the first index information;

estimating third index information indicating that the third variable is achieved after the predetermined time, using a fourth variable obtained by shifting the first variable;

estimating abnormality propagation information expressing an index indicating that an abnormality propagates to the third variable, by changing the first variable;

estimating abnormality factor information regarding an abnormality factor of a component in a target system based on the abnormality propagation information; and restoring the target system based on an abnormal state to resolve the abnormality factor that caused the target system to enter the abnormal state, based on the abnormality factor information that has been estimated.

5. The estimation method according to claim 4, wherein the first to third index information are each an occurrence probability or a normality degree.

6. The estimation method according to claim 4, wherein the abnormality factor information is estimated using Bayesian processing.

7. A non-transitory computer-readable recording medium that includes a program including instructions recorded thereon, the instructions causing a computer to perform:

receiving, as input, a second variable that influences a first variable output by a first component, wherein the second variable is output by a second component that is in a causal relationship with the first component;

estimating, using the second variable, first index information indicating that the first variable is achieved after a predetermined time at a normal time;

estimating second information indicating that a third variable output by a third component influenced by the first variable is achieved after the predetermined time, using the first index information;

estimating third index information indicating that the third variable is achieved after the predetermined time, using a fourth variable obtained by shifting the first variable;

estimating abnormality propagation information expressing an index indicating that an abnormality propagates to the third variable, by changing the first variable; and estimating abnormality factor information regarding an abnormality factor of a component in a target system based on the abnormality propagation information; and restoring the target system based on an abnormal state to resolve the abnormality factor that caused the target system to enter the abnormal state, based on the abnormality factor information that has been estimated.

8. The non-transitory computer readable recording medium according to claim 7, wherein the first to third index information are each an occurrence probability or a normality degree.

9. The non-transitory computer readable recording medium according to claim 7, wherein the abnormality factor information is estimated using Bayesian processing.

* * * * *